United States Patent [19]

Margalit et al.

[11] 4,223,079
[45] Sep. 16, 1980

[54] NON-AQUEOUS PRIMARY BATTERY HAVING A STANNOUS SULFIDE CATHODE

[75] Inventors: Nehemiah Margalit, Levittown; Robert A. Maroney, Yardley, both of Pa.

[73] Assignee: ESB Technology Company, Yardley, Pa.

[21] Appl. No.: 28,285

[22] Filed: Apr. 9, 1979

[51] Int. Cl.$^2$ ............................................. H01M 6/16
[52] U.S. Cl. ..................................... 429/194; 429/218
[58] Field of Search ................. 429/194, 195, 197, 218

[56] References Cited

U.S. PATENT DOCUMENTS 3,988,164 10/1976 Liang et al. ........................ 429/218
4,118,550 10/1978 Koch ................................. 429/194

Primary Examiner—Donald L. Walton
Attorney, Agent, or Firm—G. W. Rudman

[57] ABSTRACT

A non-aqueous primary battery comprised of an electrolytic solution of a solvent and a solute, a separator, an anode, and a stannous sulfide cathode is provided. The electrochemical system of this invention is particularly useful in small primary batteries commonly referred to as "button cells" due to its high volumetric energy density and retention of cell dimensions.

6 Claims, 1 Drawing Figure

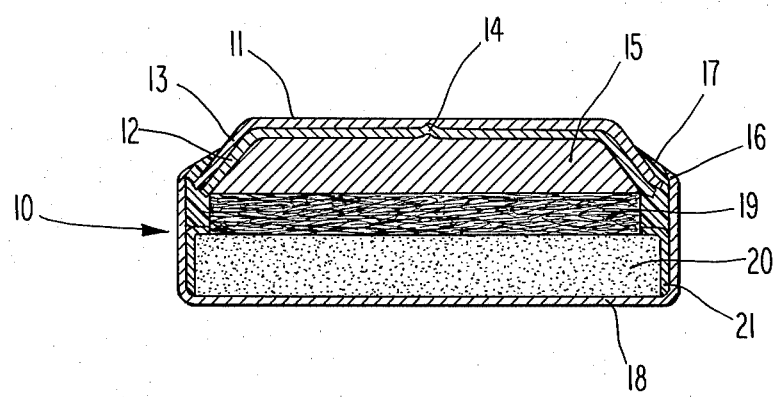

NON-AQUEOUS PRIMARY BATTERY HAVING A STANNOUS SULFIDE CATHODE

BACKGROUND OF THE INVENTION

1. Field of the Invention

This invention relates to electrochemical cells. More particularly, it relates to electrochemical cells having a light metal anode, a non-aqueous electrolyte of solvent and solute, and a stannous sulfide cathode.

2. Description of the Prior Art

The prior art discloses many high energy density battery systems which employ a light metal anode in combination with non-aqueous, organic electrolyte solution and a metal sulfide cathode.

A search revealed the following patents: U.S. Pat. No. 3,542,601 issued to J. P. Gabano, U.S. Pat. No. 3,749,603 issued to R. R. Stringham et al, U.S. Pat. No. 3,884,723 issued to K. G. Wuttke, U.S. Pat. No. 3,926,669 issued to J. J. Auborn and U.S. Pat. No. 4,013,818 issued to B. A. Askew et al.

U.S. Pat. No. 3,542,601 discloses a non-aqueous battery having an anode of an alkali earth metal and a cathode which is a halide or sulfide. The cathode materials disclosed are cupric chloride and cupric sulfide.

U.S. Pat. No. 3,749,603 discloses an alkaline metal/sulfur battery having a cathodic current collector coated with molybdenum disulfide.

U.S. Pat. No. 3,884,723 discloses an improvement in a button type galvanic cell. The galvanic cells disclosed can employ a wide variety of anode, cathode and electrolyte materials. The anodes disclosed are light metals. The cathode materials disclosed are carbon fluoride and the oxides, fluorides, sulfides, phosphates and chromates of metals such as iron, copper, nickel, silver, vanadium and tungsten.

U.S. Pat. No. 3,926,669 discloses an electrochemical cell having an oxidizable active material anode, material, a solid metallic cathode current collector, and an electrolytic solution of solvent and solute between the anode and the cathode current collector. The cathode is a solid non-consumable electrically conducting, inert current collector upon the surface of which the inorganic solute is electrochemically reduced. Listed among the many current collector materials is the element tin. The current collector does not take part in the electrochemical reaction.

U.S. Pat. No. 4,013,818 discloses a high temperature lithium-metal sulfide secondary battery. Iron sulfide is the only sulfide disclosed.

SUMMARY OF THE INVENTION

This invention is directed to an electrochemical cell comprised of a light metal anode, a separator, an electrolytic solution of a non-aqueous solvent containing an electrolyte salt (solute) and a stannous sulfide cathode.

BRIEF DESCRIPTION OF THE DRAWINGS

FIG. 1 is a cross-sectional view of a non-aqueous primary battery of this invention in a completed assembly condition.

DESCRIPTION OF PREFERRED EMBODIMENT

This invention is a non-aqueous primary battery comprised of an anode, a cathode, a separator between the anode and cathode, and an electrolytic solution of solvent and solute, wherein the cathode is a stannous sulfide.

The anodes which may be used in the batteries of this invention are the light metals, for example, lithium, magnesium, aluminum, beryllium, calcium, sodium, and potassium. These metals may be used in their pure metallic state or they may be alloyed with each other or other metals. These metals may be used in sheet form or as powders with or without plastic binders. Lithium is the preferred anode material.

The electrolytic solution is comprised of solvent and solute dissolved therein. Additives such as stabilizers can also be present. The solvent can be any which is compatible with the components of the battery. Compatible solvents include: tetrahydrofuran, methyl formate, methyl acetate, ethyl acetate, propylene carbonate, 1,2-dimethoxethane, 1,3-dioxolane, gamma-butyrolactone, dimethyl carbonate, ethyl N, N-dimethyl carbonate, the dimethyl ether of diethyl glycol, N-nitrosodimethylamine, dimethyl sulfite, acetonitrile, dimethyl sulfoxide, butylformate, dimethoxy ethane and mixtures thereof. The preferred solvents are propylene carbonate, 1,2-dimethoxyethane, and gamma-butyrolactone and mixtures thereof. The above solvents are merely representatives and other solvents compatible with the anode and the cathode may be used, as well as mixtures of the solvents.

The solute is an inorganic salt of a metal, preferably the same metal as the anode. The solute is present to provide electrical conductivity to the organic solvent. The metal salts may be selected from perchlorates, hexafluorophosphates, tetrafluoroborates, tetrachloroaluminates, hexafluoroarsenates, halides and trifluoromethylsulfonates. The above salts are merely representative and other solutes exhibiting sufficient conductance in solution and allowing for cell reaction to proceed may be utilized.

The cathode material is stannous sulfide. In button cell constructions, it is preferred that other ingredients not be included in the cathode mix in order to provide the maximum electrochemical capacity. However, if desired, conductive ingredients, such as graphite, carbon, or a suitable metal powder, and a plastic binder, such as polytetrafluoroethylene, may be incorporated into the mix.

The anode and cathode must be separated by a separator material to prevent short circuits. It is generally preferred to use a glass mat material, with one or two layers of the glass mat being effective without unduly impairing the voltage. Other useful materials include microporous polypropylene, microporous polytetrafluoroethylene, and microporous polysulfide.

Referring now to FIG. 1, a button cell construction 10 is illustrated, for button cells were selected to evaluate the non-aqueous primary battery system using the novel cathode. These button cells are the type currently used as the power source for electric watches, calculators, cameras, hearing aids, etc., application for which the non-aqueous primary batteries are particularly effective.

The anode container 11 comprises what is commonly referred to as a "double top". Two cans are placed in physical, electrical contact with each other with the inner can 12 being nestled in the outer can 13 to form a tight friction fit. It is generally preferred to spot weld the cans together as indicated at 14 to maintain permanent electrical contact. The cans may be made from stainless steel, which has good corrosion resistance, however other material such as nickel-plated steel may be used and the surfaces of the can may be given special coatings. The "double top" container is preferred for superior leakage prevention properties, however, a "single top" container may be used and thereby provide more space for electrochemically active material. A collar or grommet 17 of suitable plastic such as polypropylene is molded onto the edge of the "double top" to electrically insulate it from the cathode container 18. The anode 15 may comprise any of the above listed materials, but it is generally preferred to use lithium. The lithium pellet may be cut or punched from a lithium sheet. In the example, 0.36 gram of lithium was pressed into the anode cavity.

In the experimental work described in the examples, the separator 19 comprised two layers of 0.025-0.038 cm thick glass mat. One layer had a larger diameter (0.940 cm) and was placed against the cathode 20, with its edges folded inwardly against the grommet 17. The smaller (0.813 cm) diameter glass mat layer was placed inside the folded edge and in physical contact with the outer layer. Electrolyte was added to the cell by vacumn impregnating the cathode and by adding 0.07 ml to the anode compartment (to the separator) prior to cell closure.

The cathode 20 was formed by thoroughly drying, grinding and then mixing cathode material to get a homogeneous blend. The mix was placed into a pelletizing die and compressed to form a cathode pellet. A force of about 4500 kg was used to form the cathode pellet, which had a height of 0.13 cm and a diameter of 1.02 cm. After the cathode pellet 20 was placed in the cathode container 18, a cathode mix ring 21 made from stainless steel was placed around the cathode pellet. The anode container 11 and its components were assembled with the cathode container 18 and its components. The grommet 17 rests upon the cathode mix ring, and the cell is sealed by compressing the upper edge 16 of the cathode container against the grommet 17 with a closing force of about 435 kg.

EXAMPLE 1

Button cells having the construction illustrated in FIG. 1 were made using a stannous sulfide (SnS) cathode. The anode was a lithium pellet having a weight of 0.36 grams, and the electrolyte was a 10% solution of $LiClO_4$ in 1,3-dioxolane.

The cathodes were made of pure commerically available SnS powder. No binders and/or conductors were added.

The SnS powder was placed into a pelletizing die. The pressure used for pellet pressing was just sufficient to obtain a handable pellet.

The cells were tested at room temperature under a 50,000 ohm load.

The results of the test are as follows:

| Cell | Average Voltage | Capacity mAhr | Energy mWhr | Energy-Density Whr/$DM^3$ | Cut-Off Voltage |
|------|-----------------|---------------|-------------|---------------------------|-----------------|
| 1 | 1.49 | 129 | 192 | 470 | 1.34 |
| 2 | 1.48 | 133 | 197 | 480 | 1.36 |
| 3 | 1.48 | 133 | 197 | 480 | 1.39 |

O.C.V. after discharge 1.6 volts.

We claim:
1. A non-aqueous primary battery having
   (a) a light metal anode selected from the group consisting of lithium, magnesium, aluminum, beryllium, calcium, sodium, and potassium;
   (b) an electrolytic solution comprised of an organic solvent and a light inorganic salt dissolved therein;
   (c) a separator; and
   (d) a cathode consisting of stannous sulfide without binder or conductor added.
2. The battery of claim 1 in which the light metal anode is lithium.
3. The battery of claim 1 wherein the inorganic salt contains the same light metal as the anode.
4. The battery of claim 1 in which concentration of the salt in the electrolytic solution ranges from about 1 molar to about 3 molar.
5. The battery of claim 3 wherein the salt is a perchlorate, hexafluorophosphate, tetrafluoroborate, tetrachloroaluminate, hexafluoroarsenate, halide or trifluoromethylsulfonate.
6. The battery of claim 1 wherein the organic solvent is propylene carbonate, 1,2-dimethoxyethane, or gamma-butyrolactone.

* * * * *